US006842139B1

(12) United States Patent
Nilsson (10) Patent No.: US 6,842,139 B1
(45) Date of Patent: Jan. 11, 2005

(54) SEPARATION FREQUENCY DETECTION IN A RADAR LEVEL GAUGE

(75) Inventor: Leif Nilsson, Linköping (SE)

(73) Assignee: Saab Rosemount Tank Radar AB, Gothenburg (SE)

( * ) Notice: Subject to any disclaimer, the term of this patent is extended or adjusted under 35 U.S.C. 154(b) by 57 days.

(21) Appl. No.: 10/687,927

(22) Filed: Oct. 20, 2003

(51) Int. Cl.[7] ............................................. G01S 13/08
(52) U.S. Cl. ..................... 342/124; 342/175; 342/205
(58) Field of Search ............................... 342/124, 175, 342/205; 73/290 R, 290 V, 304 R, 304 C, 305–322, 322.5; 324/644

(56) References Cited

U.S. PATENT DOCUMENTS

| | | | | | |
|---|---|---|---|---|---|
| 4,135,397 | A | * | 1/1979 | Krake | ....................... 73/290 R |
| 6,072,427 | A | * | 6/2000 | McEwan | ..................... 342/175 |
| 6,137,438 | A | * | 10/2000 | McEwan | ..................... 342/134 |
| 6,300,897 | B1 | * | 10/2001 | Kielb | .......................... 342/124 |
| 6,452,467 | B1 | * | 9/2002 | McEwan | ..................... 333/240 |
| 6,628,229 | B1 | * | 9/2003 | Johnson et al. | ............. 342/124 |

* cited by examiner

Primary Examiner—John B. Sotomayor
Assistant Examiner—Isam Alsomiri
(74) Attorney, Agent, or Firm—Westman, Champlin & Kelly, P.A.

(57) ABSTRACT

A separation frequency detector circuit and a method for detection of a separation frequency in a radar level gauge. A first circuit element (1) is arranged to receive a first clock frequency, and a second clock frequency. An instantaneous value of the first clock frequency will be transferred to and held at an output Q of the first circuit element (1) once each period of the second clock frequency. A predetermined value will be transferred to and held at an output Q of a second circuit element (3) triggered by the output Q of the first circuit element (1), and the predetermined value will be cleared from the output Q of the second circuit element (3) a predetermined time period after being triggered. An output is obtainable as a short pulse with a leading edge which will be synchronized with the first change of the leading signal edge of the first circuit element (1).

15 Claims, 11 Drawing Sheets

Fig. 11

SEPARATION FREQUENCY DETECTION IN A RADAR LEVEL GAUGE

TECHNICAL FIELD

The present patent application relates to a separation frequency detector circuit for a radar level gauge. The present patent application further relates to a method for detection of a separation frequency in a radar level gauge. The invention can be used to generate an essentially chatter free difference frequency signal in fluid level sensing radar gauging systems.

BACKGROUND OF THE INVENTION

Non-contact range measurement pulse-echo radar systems for fluid level sensing in tanks and vats typically consist of a transmitter which is arranged to radiate short duration radio frequency (RF) bursts toward the surface of the product being stored in the tank or vat via a highly directional antenna. After a delay a receiver is gated at a particular point in time to receive energy which is reflected from the surface of the product. The timing of gating of the receiver is typically swept across a range of delays in a matter of milliseconds, such that a video output of the receiver can be provided as a scan like waveform. This waveform replicates occurring echoes on a real-time scale, corresponding to the physical distances represented by the echoes as the exact delay of a received echo pulse in relation to the transmitted pulse, i.e. the time of flight of the pulse, provides a measure of the distance to the reflecting object.

Highly accurate timing of the transmitted RF bursts and the gating of the receiver is necessary in order to be able to obtain high accuracy range information.

A precision digital pulse phase generator timing circuit is previously known through U.S. Pat. No. 6,300,897 B1 which relates to a radar gauge adapted to sense fluid level in a tank and including a radar gauge circuit in which radar transmission and level sampling are controlled by a transmit frequency and a sample frequency respectively. A first frequency separation between first and second frequencies is controlled by a control input. The first and second frequencies can be divided to generate the transmit and sample frequencies, separated by a second frequency separation. At least one frequency difference is evaluated and the evaluation used to generate the control input, stabilizing the first frequency difference, and to correct the gauge output.

This timing circuit previously known through FIG. 8 of U.S. Pat. No. 6,300,897 which is hereby incorporated by reference in its entirety, comprises a frequency difference circuit which receives the transmit clock frequency and the sample clock frequency and generates a frequency difference output. A polarity sensing circuit senses the polarity of the sample clock relative to the frequency difference output and generates a polarity, or sign, output. Both of these functions are suggested to be performed using low cost type 7474 clocked D flip flop circuits.

However, taking into account the timing requirements regarding setup and hold times for this kind of D flip-flop, the above separation frequency detector is not a very robust solution. If the signal at the D-input changes within the forbidden set-up and hold-time window, one of two reactions of the flip-flop can be observed:
1) The flip-flop works perfectly with no special behaviour;
2) The output of the flip-flop becomes unstable or "metastable".

If the output of a the flip-flop is "metastable", the output voltage is higher than the low-level-limit, but lower than the high-level-limit i.e. it is in the forbidden area between digital low and high. This situation can last less than 1 ns, but could also last longer than 30 ns. Also, the state the D flip-flop goes to after being metastable is random. The resulting behavior for the prior art circuit is that, during the time frame when the phase slip between the TX and RX clock is such that the setup/hold requirements are being violated, the output signal of the D flip-flop may change state each time it is being clocked. Thus, each edge of the Delta F signal may toggle or "chatter" with the frequency of the TX-clock for a duration corresponding to the sweep/phase slip time when the setup/hold time are being violated.

Another issue is that the TX and RX clock will always have some degree of phase noise. If the phase slip 1 separation frequency is slow enough the output may toggle or "chatter" simply due to the phase noise of the clock signals. However, the D flip-flop will only toggle for sure if the maximum differential phase noise between the two clock signals is greater than the sum of the setup and hold time for the flip-flop.

SUMMARY OF THE INVENTION

One object of the invention is to provide an improved separation frequency detector circuit for a radar level gauging system.

A further object of the present invention is to provide an essentially chatter free separation frequency detector circuit for a radar level gauging system which produces a distinct pulse the leading edge of which is synchronized with the first change of an original difference frequency leading edge without chatter.

A still further object of the present invention is to provide an essentially chatter free separation frequency detector circuit for a radar level gauging system which also produces a distinct pulse the trailing edge of which is synchronized with the first change of an original difference frequency trailing edge without chatter.

Another object of the present invention is to provide an essentially chatter free separation frequency detector circuit for a radar level gauging system which produces a restored difference frequency signal having the same duty cycle as an original difference frequency signal without chatter at the leading an trailing edges thereof.

Yet another object of the present invention is to provide an essentially chatter free separation frequency detector circuit for a radar level gauging system which is arranged to also provide an output signal indicative of the polarity of the difference frequency.

Briefly, a separation frequency detector circuit for a radar level gauge in accordance with a first embodiment of the present invention comprises a first circuit element which is arranged to receive a first clock frequency, and a second clock frequency, said first circuit element being arranged such that an instantaneous value of the first clock frequency will be transferred to and held at an output Q thereof once each period of the second clock frequency, and a second circuit element arranged such that a predetermined value will be transferred to and held at an output Q thereof triggered by the output signal Q from said first circuit element, and said second circuit element further being arranged to clear said predetermined value from said output Q of said second circuit element a predetermined time period after being triggered, whereby an output is obtainable as a short pulse with a leading edge which will be synchronized with the first change of the original ΔF leading signal edge and no toggling will occur.

A further object of the present invention is to provide an improved method for detection of a separation frequency in a radar or laser rangefinder.

Briefly, a first embodiment of a method for detection of a separation frequency in a radar level gauge comprises the steps of: arranging a first circuit element to receive a first clock frequency, and a second clock frequency, and; arranging said first circuit element such that an instantaneous value of the first clock frequency will be transferred to and held at an output Q thereof once each period of the second clock frequency, and; arranging a second circuit element such that a predetermined value will be transferred to and held at an output Q thereof triggered by the output signal Q from said first circuit element, and; arranging said second circuit element to clear said predetermined value from said output Q of said second circuit element a predetermined time period after being triggered, whereby a short pulse can be generated with a leading edge which will be synchronized with the first change of the original $\Delta F$ leading signal edge and no toggling will occur.

A still further object of the present invention is to provide an improved radar level gauge arranged to use microwaves for determining a level of a surface of a product stored in a container.

Briefly, a fist embodiment of the radar level gauge comprises a separation frequency detector in accordance with the present invention for precisely determining the separation frequency between said first and second clock frequencies of said radar level gauge for improved radar level gauging.

An advantage of the circuit and method in accordance with the present invention compared to prior art circuits and methods is that distinct and essentially chatter free detection of a separation frequency is obtainable using low cost standard components.

A further advantage of the circuit and method in accordance with the present invention is that a stable and essentially chatter free generation of output signal indicative of the polarity of the difference frequency is obtainable.

Further advantages and benefits of the present invention will become apparent from the following detailed description considered in conjunction with the accompanying drawings.

DESCRIPTION OF DRAWINGS

In the following, the invention will be described in greater detail with reference to attached drawings, in which.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DESCRIPTION OF EMBODIMENTS

In a radar fluid level sensing device, a transmitter generates a sequence of pulses which are directed towards a fluid surface, and the transmitter control output clock pulse TX control the transmitted pulses. A swept range gated receiver, triggered by the receiver control output clock pulse RX, receives reflected signals from the fluid surface whereby the fluid level can be determined.

Figure 1:
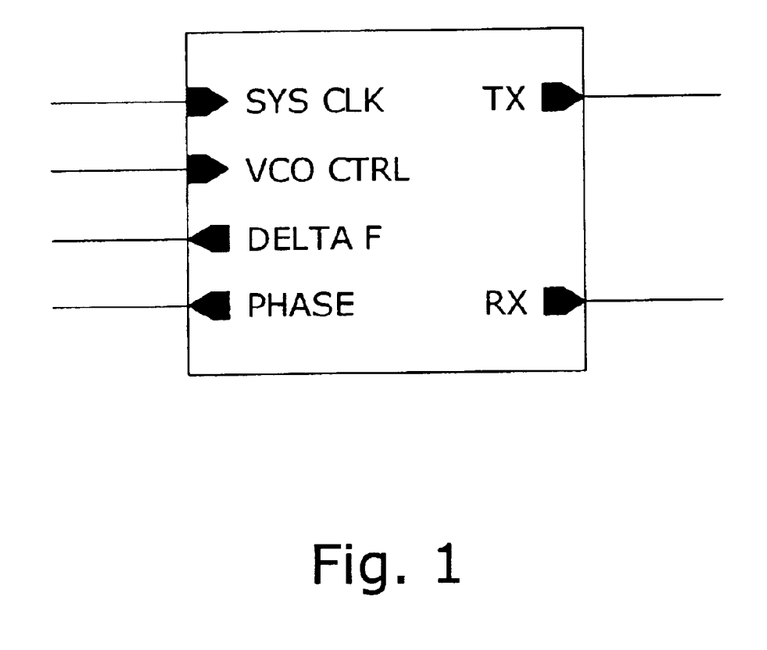
FIG. 1 illustrates a typical signal definition, simple block diagram, of a timing generator for a radar level gauge.

The present invention is an enhancement of prior art related to a separation frequency detector which is typically used in timing generators based on controlling a fixed separation frequency between two oscillators. The invention could be used in any timing circuit based on controlling/measuring the separation frequency between two oscillators. FIG. 1 illustrates a typical signal definition, simple block diagram, of such a timing generator. This timing generator has an SYS CLK input, which generates the Pulse Repetition Frequency PRF (TX clock). The Voltage Controlled Oscillator VCO CTRL input is an analog signal input controlling the frequency of the RX clock and thus also the separation frequency $\Delta F$. The DELTA F output provides the separation frequency. The frequency of this signal is measured by a system processor and kept stable by adjusting the VCO CTRL signal accordingly. The PHASE output indicates the polarity of the DELTA F signal, i.e. indicates whether the RX frequency is higher or lower than the TX frequency. The TX output is the transmit clock and the RX output is the receive or sample clock.

In order for the timing generator to operate a function which detects the separation frequency $\Delta F$, i.e. the separation frequency between the oscillator outputs TX and RX is required. In accordance with the prior art arrangement of U.S. Pat. No. 6,300,897, the separation frequency is obtained using a standard logic circuit known as an edge triggered flip-flop or D flip-flop.

The input of the D flip-flop is transferred to the output once each period of the TX clock, i.e. at the rising or falling edge of the TX clock signal depending on the type of flip-flop. However, the output of the D flip-flop will only change phase when the phase of the input signal, at the triggering edge of the TX clock input, changes 180 degrees.

Thus, the Q output of the D flip-flop will be a signal with a frequency which is equal to the difference between the TX and RX frequencies. Another feature is that the phase of the output of the flip-flop will also be closely tied to the phase slip/difference between the TX and RX clocks, i.e. the separation frequency signal changes state when the phase slip between the TX and RX clocks is either zero or 180 degrees.

Figure 2:
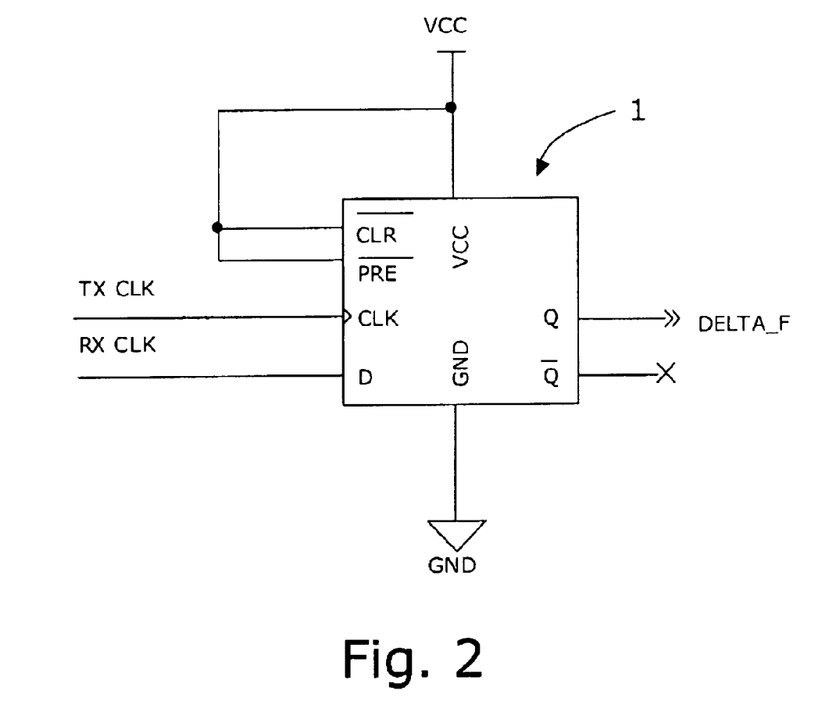
FIG. 2 illustrates a prior art separation frequency detector for a radar level gauge.

FIG. 2 illustrates a prior art separation frequency detector 1 based on a standard D flip-flop (74HC74). The /CLR and /PRE inputs are kept at a logic high while the TX clock (TX CLK) is fed to the CLK input. The RX clock (RX CLK) is fed to the D input. The separation frequency ΔF (DELTA_F) is provided by the Q output of the D flip-flop.

Figure 3:
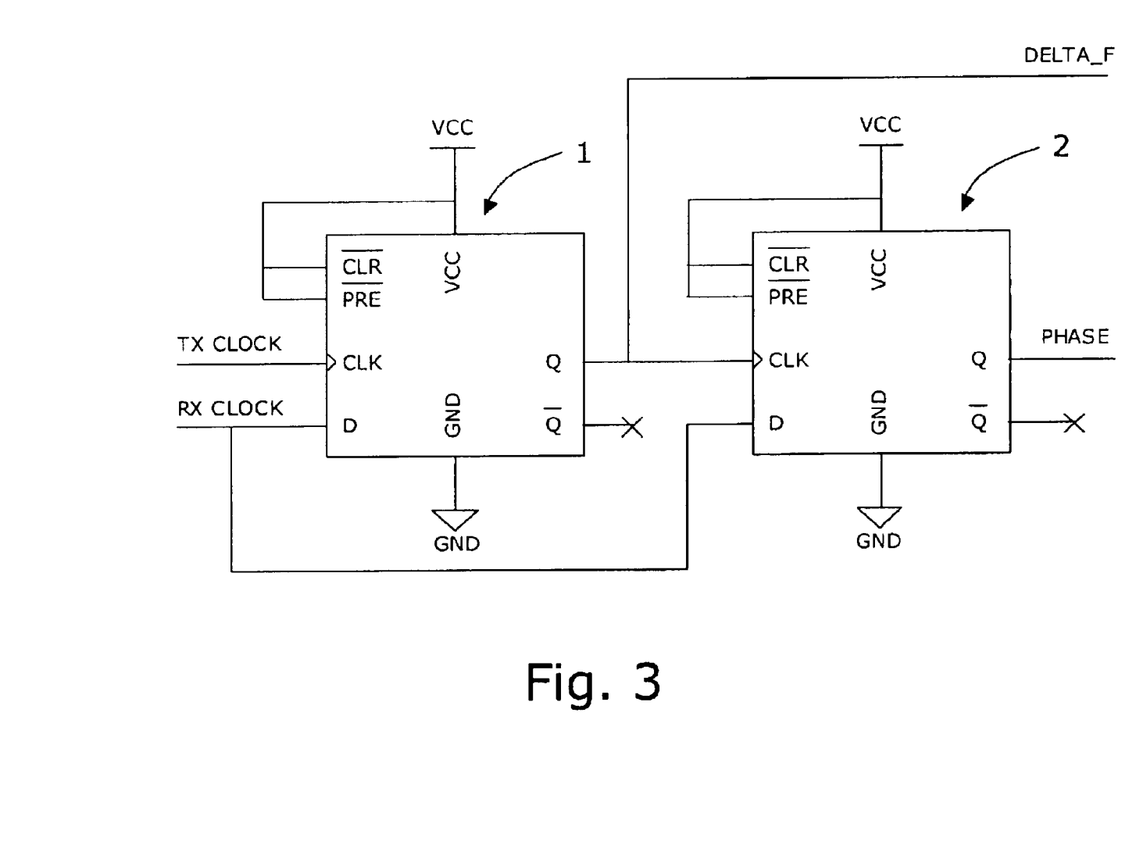
FIG. 3 illustrates the prior art separation frequency detector of FIG. 2 with increased functionality for providing an output signal indicating the polarity of the separation frequency.

To further increase the functionality of the prior art separation detector 1, it may be equipped with an output signal indicating the polarity of the separation frequency ΔF, just by adding an additional D flip-flop 2, as illustrated by the prior art arrangement of FIG. 3. The sample polarity detector 2 is connected as a flip-flop that stores the polarity of the sample clock (RX CLOCK) after the leading edge of the transmit clock (TX CLOCK) toggles the Q output of the difference frequency detector 1. The output of the transmit sample polarity detector 2 can be coupled to a microprocessor (not shown) to indicate whether the sample clock has a lower or higher frequency than the transmit clock. The polarity detector 2 resolves any ambiguity in the absolute value of the frequency difference.

A standard D flip-flop (74HC74) can be used also as the additional D flip-flop 2. The /CLR and /PRE inputs are kept at a logic high while the separation frequency ΔF at the Q output of the first D flip-flop 1 is fed to the CLK input of the additional D flip-flop 2. The RX clock is fed to the D input of the additional D flip-flop 2. The polarity or PHASE signal is provided by the Q output of the additional D flip-flop 2.

Assuming that the TX frequency is higher than the RX frequency, the PHASE signal will always be low since each time the additional flip-flop 2 is clocked by the rising edge of the ΔF signal the RX clock will always be high, due to the propagation delay from actual phase shift of the RX clock to the time when the output of the first flip-flop 1 changes state and vice versa when the TX frequency is lower than the RX frequency.

In theory and even for some specific manufacturers/batches of D flip-flops, a circuit such as the prior art circuit of FIG. 3 might work well. However, taking into account the requirements of setup and hold times for a practical D flip-flop, e.g. the standard D flip-flop (74HC74), the prior art separation frequency detector of FIG. 3 is not a very robust solution. If the signal at the D-input changes within the forbidden set-up and hold-time window, one of two reactions of the flip-flop can be observed:
1) The flip-flop works perfectly with no special behaviour;
2) The output of the flip-flop becomes unstable or "metastable".

If the output of a the flip-flop is "metastable", the output voltage is higher than the low-level-limit, but lower than the high-level-limit i.e. it is in the forbidden area between digital low and high. This situation can last less than 1 ns, but could also last longer than 30 ns. Also, the state the D flip-flop goes to after being metastable is random. The resulting behaviour for the prior art circuit is that, during the time frame when the phase slip between the TX and RX clock is such that the setup/hold requirements are being violated, the output signal of the D flip-flop 1 may change state each time it is being clocked. Thus, each edge of the Delta F signal may toggle or "chatter" with the frequency of the TX-clock for a duration corresponding to the sweep/phase slip time when the setup/hold time are being violated.

Another issue is that the TX and RX clock will always have some degree of phase noise. If the phase slip/separation frequency is slow enough the output may toggle or "chatter" simply due to the phase noise of the clock signals. However, the D flip-flop will only toggle for sure if the maximum differential phase noise between the two clock signals is greater than the sum of the setup and hold time for the flip-flop.

Assuming the following designations, ΔF [Hz]= Separation Frequency, $t_s$ [s]=Setup time of the D flip-flop, $t_H$ [s]=Hold time for the D flip-flop, PRF [Hz]=TX clock/Pulse Repetition Frequency, C [m/s]=3E8 (Speed of Light), the time the D flip-flop is used out of specification corresponds to $$T_{PROBLEM}=[PRF \times (t_s+t_H)]/\Delta F \quad [1]$$

Figure 4:
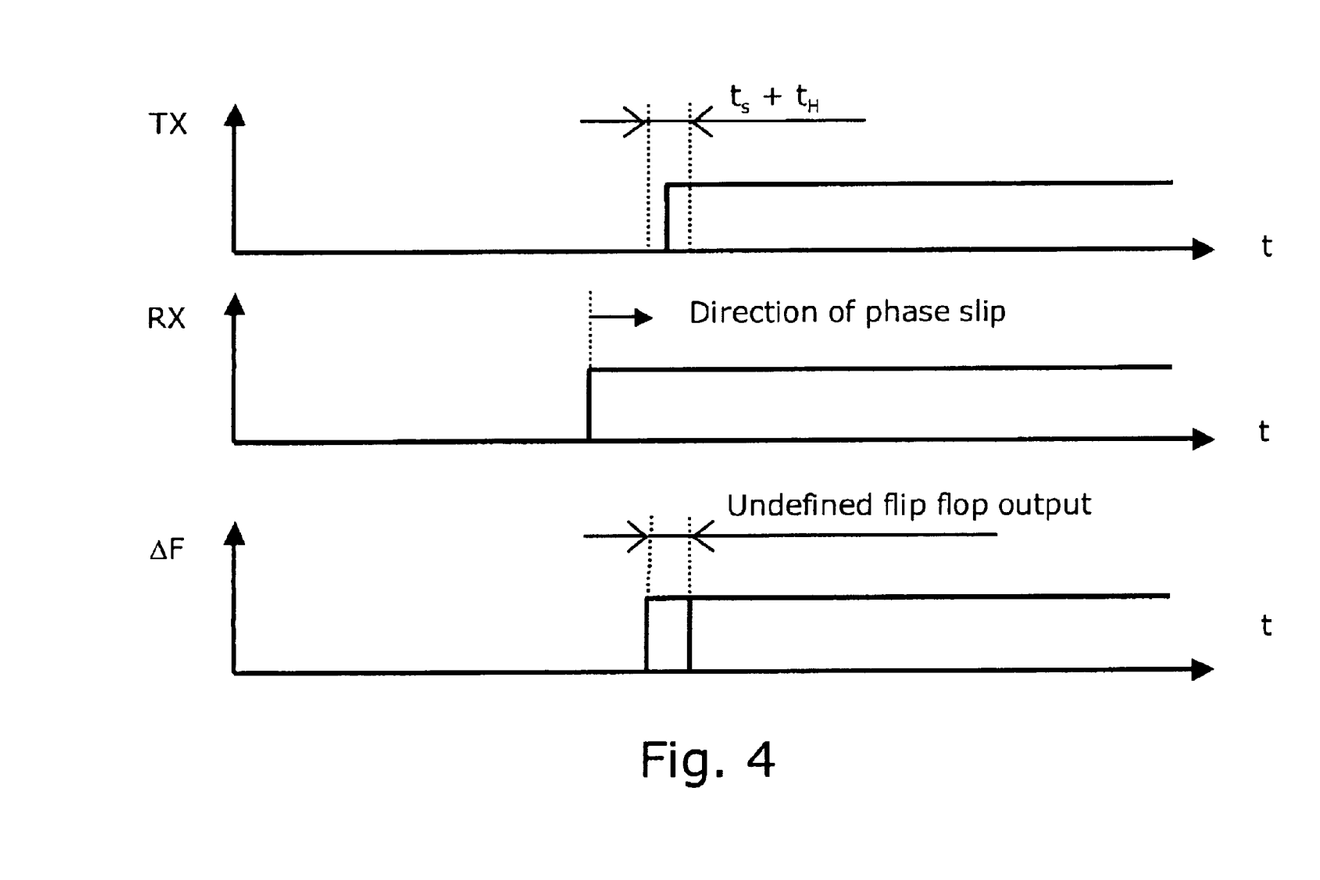
FIG. 4 illustrates a timing diagram of erroneous D flip-flop usage.

An example D flip-flop (Fairchild 74AC74) has a typical $t_s+t_H$ of 1.0 ns at 25 deg C. and a guaranteed minimum of 4.0 ns (−40 to +85 deg C.). Thus the above expression [1] yields a worst-case persistence of roughly 230 μs (occurring at each phase shift of the separation frequency signal) (ΔF=8 Hz, PRF=1.8432 MHz) at room temperature, which is much longer than a measured persistence. Thus, the time the D flip-flop "chatters" is typically much less than the theoretical worst case persistence. FIG. 4 illustrates a timing diagram of the erroneous D flip-flop usage.

The maximum real time delay of the RX clock versus the TX clock corresponds to 1/PRF (e.g. 542.5 ns which would render a maximum measuring range of 81,4 m for an associated radar level gauge). The time for the phase slip to cover the maximum real time delay is equal to 1/ΔF. Thus the worst case chatter equal to $T_{PROBLEM}$ would cause a maximum measurement error corresponding to $$\text{Error [mm]}=1000 \times [T_{PROBLEM} \times \Delta F] \times C/[2 \times PRF] \leq 150 \text{ mm.} \quad [2]$$

However, assuming the chattering time is equal from one period of the ΔF-signal to the succeeding period the error will be cancelled out.

In practice the measurement error caused by the above described potential malfunction may perhaps be acceptable, but some implementations of the generation of the PHASE signal and the detection of the separation frequency does not tolerate any chatter or glitches on the separation frequency signal. Note, that even without chatter on the ΔF signal the propagation delay of the first flip-flop 1 (se FIG. 3) needs to be longer than the setup time required for the second flip-flop 2.

Figure 5:
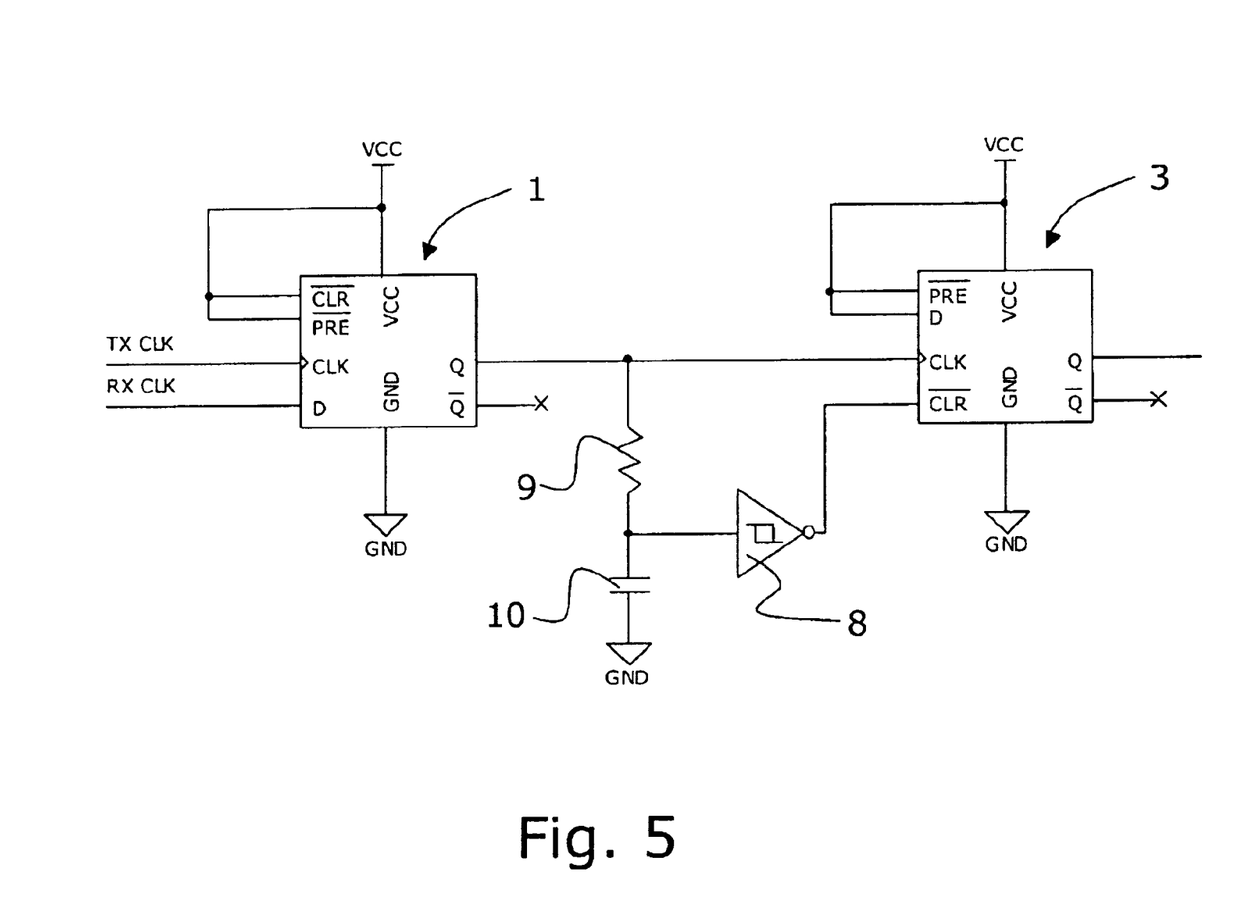
FIG. 5 shows an improved separation frequency detector in accordance with a first embodiment of the present invention.

FIG. 5 shows an improved separation frequency detector in accordance with a first embodiment of the present invention as described above. In accordance with the present invention it is therefore suggested to use the original ΔF signal from the first D flip-flop to clock a second circuit element 3, such as a second edge triggered D flip-flop with a predefined logic input state and use a delayed version of the original ΔF signal edge to reset the output of the second flip-flop 3 a predetermined time period thereafter. Note that the /CLR and /SET control pins of the second D flip-flop 3 are independent of the CLK input and that they are not edge sensitive. The output will be a short pulse with a leading edge which will be synchronized with the first change of the original ΔF leading signal edge and no toggling will occur as long as the delay is selected to be significantly longer than the time defined by equation [1].

The separation frequency detector circuit for a radar level gauge according to FIG. 5 comprises a first circuit element 1, such as a first edge triggered flip-flop or D flip-flop, which is arranged to receive a first clock frequency, and a second clock frequency. The first circuit element 1 is arranged such that an instantaneous value of the first clock frequency will be transferred to and held at an output Q of the first circuit element 1 once each period of the second clock frequency. A second circuit element 3, such as a second edge triggered flip-flop or D flip-flop, is arranged such that a predetermined value will be transferred to and held at an output Q of the second circuit element 3 triggered by the output signal Q from the first circuit element 1. The second circuit element 3 is further arranged to clear said predetermined value from the output Q of the second circuit element 3 a predetermined time period after being triggered.

The first clock frequency is preferably a sample clock frequency RX and the second clock frequency a transmit clock frequency. However, as will be obvious to the person skilled in the art, the first clock frequency can also be a transmit clock frequency TX and the second clock frequency a sample clock frequency RX, which will provide a corresponding output signal of inverted sign.

Figure 6:
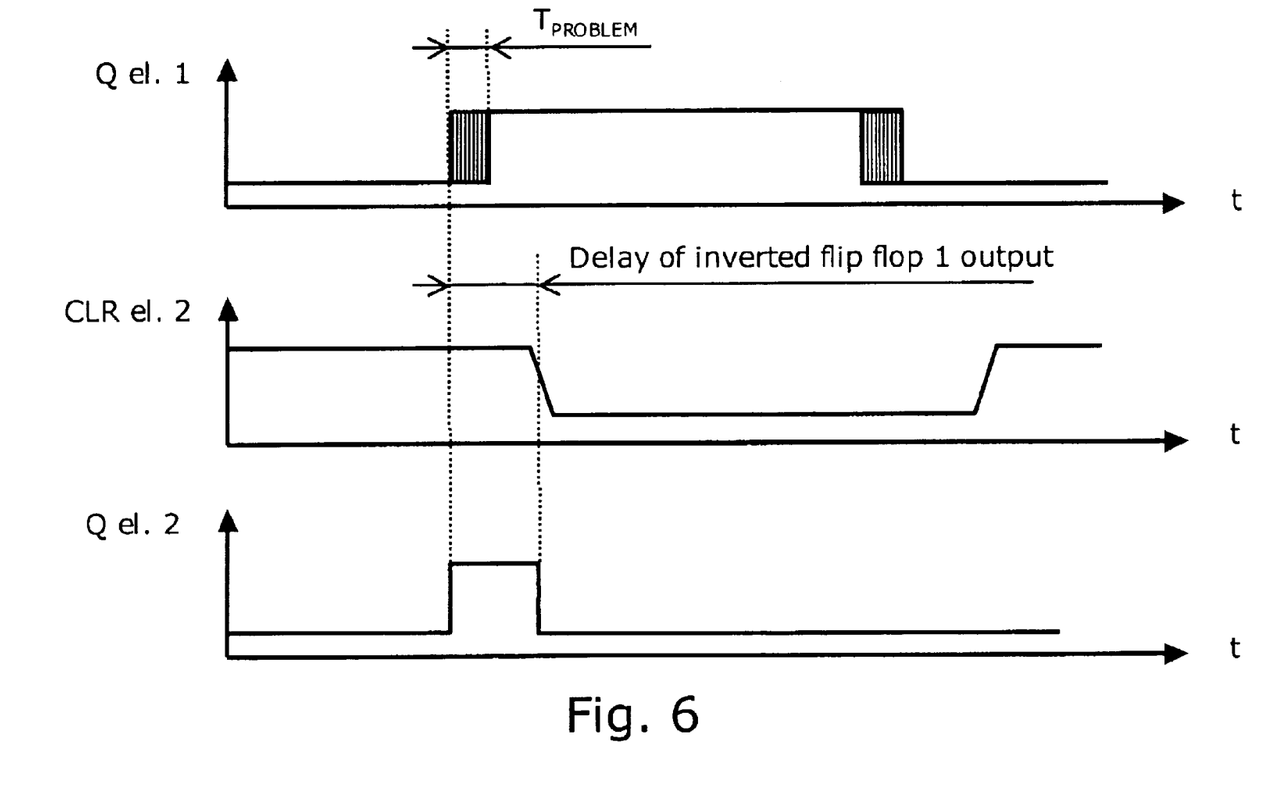
FIG. 6 shows an explanatory timing diagram of the improved frequency detector of FIG. 5.

FIG. 6 shows an explanatory timing diagram of the improved frequency detector of FIG. 5. Note that no false pulse will occur at the falling edge of the original ΔF signal since the second flip-flop will be held cleared by the delayed "/CLR" signal. The topmost diagram illustrates the output Q of the first circuit element 1 over time. The middle diagram illustrates the CLR signal provided to the second circuit element. The lowermost diagram illustrates the Q output of the second circuit element 3.

Figure 7:
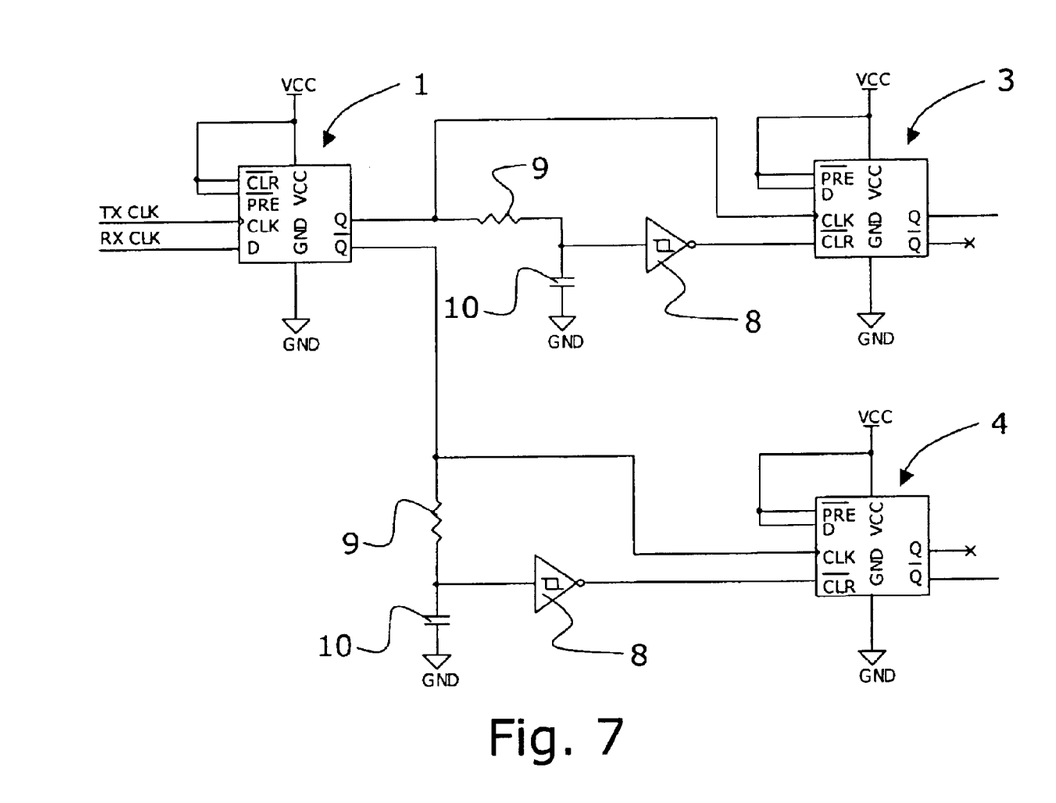
FIG. 7 illustrates a second embodiment of an improved separation frequency detector in accordance with the present invention.

As shown in FIG. 7, in a second embodiment of an improved separation frequency detector, by applying essentially the same technique to both edges, i.e. rising and falling edge, of the original ΔF signal, two synchronized short pulses can be created. This is achieved through arranging a third circuit element 4, such as a third edge triggered flip-flop or D flip-flop with a predetermined logic input state, such that a predetermined value will be transferred to and held at an inverted output /Q thereof triggered by an inverted output signal /Q from said first circuit element 1. Said third circuit element 4 further being arranged to clear said predetermined value from said inverted output /Q of said third circuit element 4 a predetermined time period after being triggered. Thus, in a corresponding manner, the output will be a short pulse with a trailing edge which will be synchronized with the first change of the original ΔF trailing signal edge and no toggling will occur as long as the delay is selected to be significantly longer than the time defined by equation [1].

Figure 8:
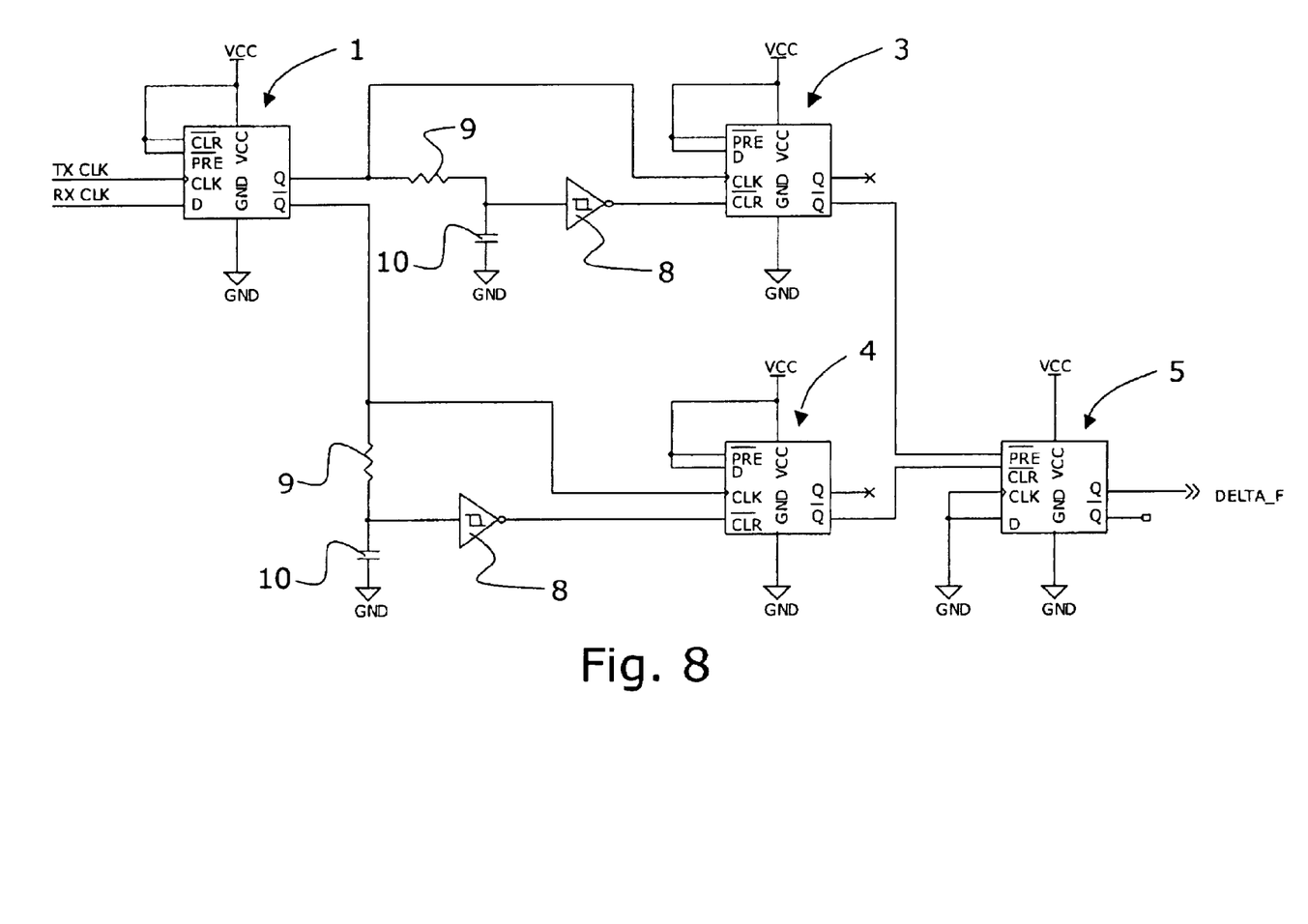
FIG. 8 illustrates an improved separation frequency detector with completely restored separation frequency signal in accordance with a third embodiment of the present invention.

The two synchronized pulses obtainable by the arrangement of FIG. 7 may be used to, in turn, create a "restored" ΔF signal, which even has the same duty cycle as the original ΔF signal. An improved separation frequency detector with completely restored ΔF signal in accordance with a third embodiment of the present invention is shown in FIG. 8. Here a fourth circuit element 5, such as a fourth edge triggered flip-flop or D flip-flop with a predefined logic input state, is arranged such that the value of an inverted output signal from said second circuit element 3 will be transferred to and held at an output Q thereof. Said fourth circuit element 5 further being arranged to clear said value triggered by an inverted output /Q from said third circuit element 4.

Figure 9:
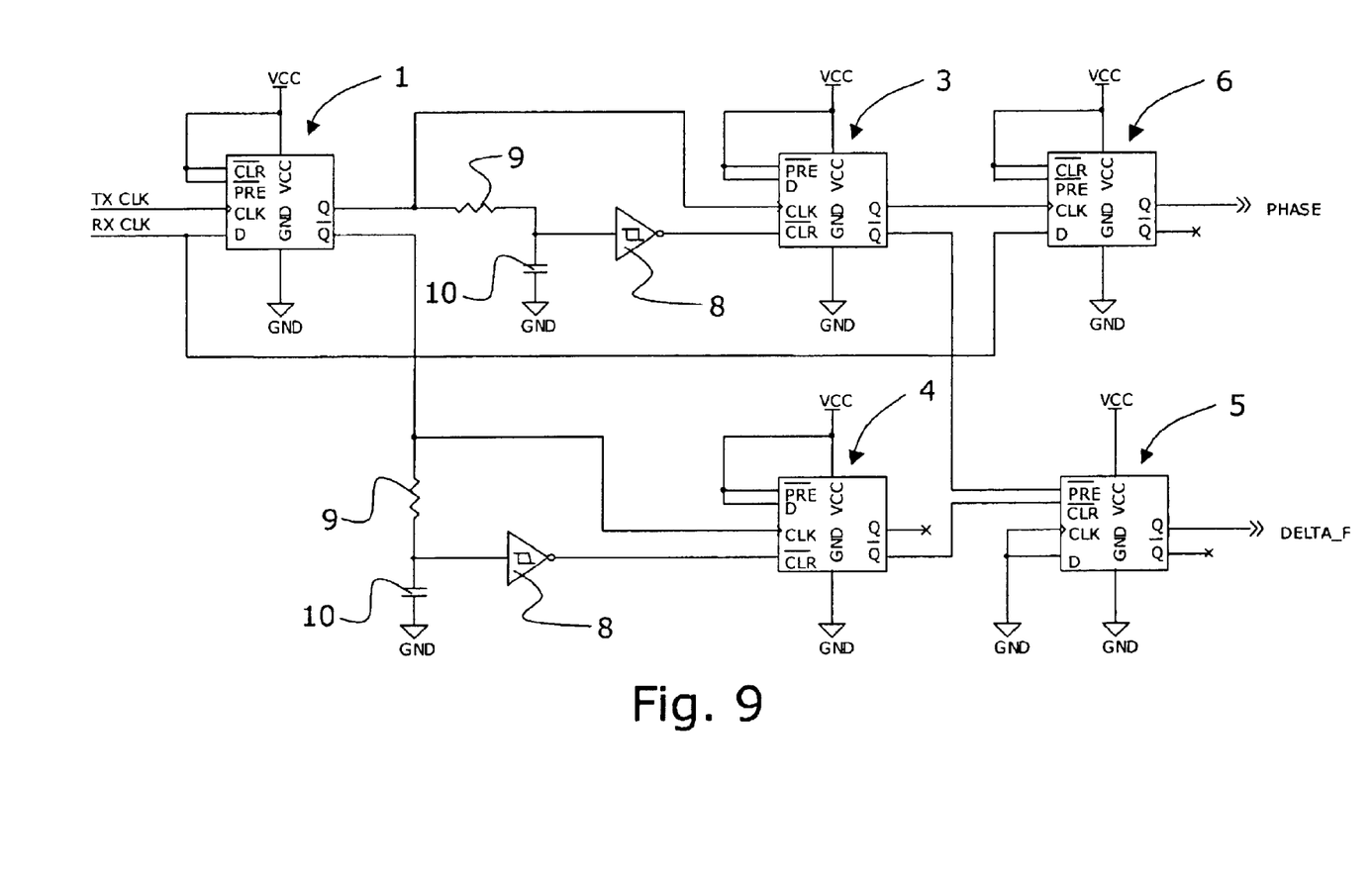
FIG. 9 illustrates the addition of a first alternative inclusion of a polarity sensing circuit element to the improved separation frequency detector of FIG. 8.

FIG. 9 illustrates the addition of a first alternative inclusion of a flip-flop 6 that stores the polarity of the first clock frequency after the leading edge of the second clock frequency toggles the Q output of the difference frequency detector. A fifth circuit element 6, such as a fifth edge triggered flip-flop or D flip-flop, is arranged to receive a first clock frequency, said fifth circuit element 6 being arranged such that an instantaneous value of the first clock frequency will be transferred to and held at an output Q thereof once each period of the output signal Q from the second circuit element 3.

Figure 10:
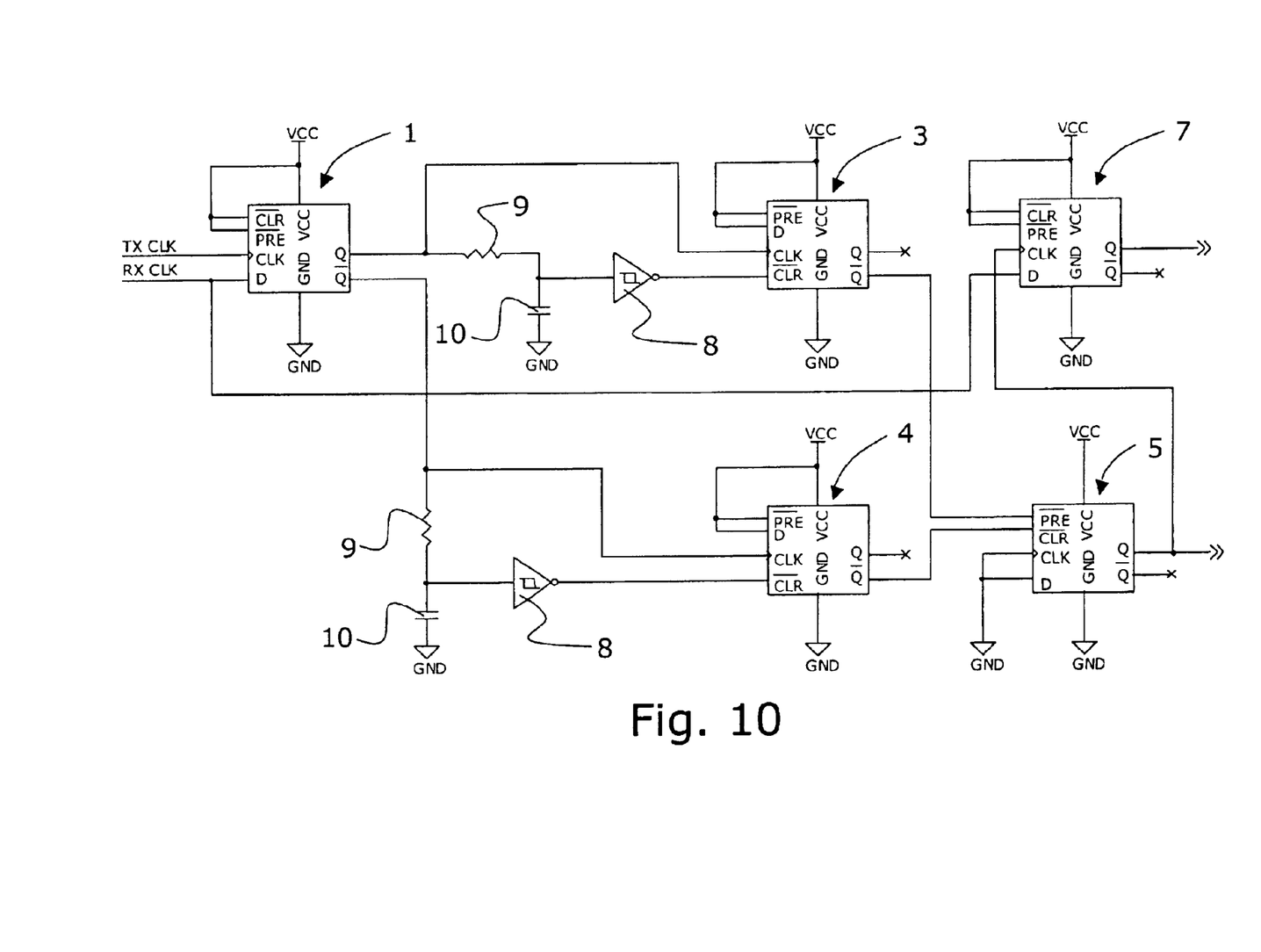
FIG. 10 illustrates the addition of a second alternative inclusion of a polarity sensing circuit element to the improved separation frequency detector of FIG. 8.

In FIG. 10 is shown a second alternative inclusion of a flip-flop 7 that stores the polarity of the first clock frequency after the leading edge of the second clock frequency toggles the Q output of the difference frequency detector. A sixth circuit element 7, such as a sixth edge triggered flip-flop or D flip-flop, is arranged to receive a first clock frequency, said sixth circuit element 7 being arranged such that an instantaneous value of the first clock frequency will be transferred to and held at an output Q thereof once each period of the output signal Q from the fourth circuit element 5.

Depending on the type of D flip-flop used the worst-case persistence may be quite long and the delayed /CLR signals of the improved circuits needs to be adjusted correspondingly. Delay can e.g. be achieved using a standard resistor 9 and capacitor 10 combination as shown in FIGS. 5, 7, 8, 9 and 10. However, to long delays will/may cause noise on the slope of the delayed /CLR signal to false trigger the corresponding inputs of the second 3 and third 4 D flip-flops. This will cause the succeeding PHASE signal generating D flip-flop 6 to malfunction. The solution is either to insert a buffer with hysteresis 8, such as a Schmitt-trigger, prior to the /CLR inputs, as illustrated in FIGS. 5, 7, 8, 9 and 10 or to use the "restored" ΔF signal to clock the "PHASE" D flip-flop 7, as illustrated in FIG. 10. The latter solution is preferred since it also increases the propagation delay and thus the setup margin for the "PHASE" D flip-flop.

A method for detection of a separation frequency for a radar level gauge in accordance with the present invention comprises the steps of: arranging a first circuit element 1, such as a first edge triggered flip-flop or D flip-flop, to receive a first clock frequency, and a second clock frequency; arranging said-first circuit element 1 such that an instantaneous value of the first clock frequency will be transferred to and held at an output Q thereof once each period of the second clock frequency; arranging a second circuit element 3, such as a second edge triggered flip-flop or D flip-flop, such that a predetermined value will be transferred to and held at an output Q thereof triggered by the output signal Q from said first circuit element 1; and arranging said second circuit element 3 to clear said predetermined value from said output Q of said second circuit element 3 a predetermined time period after being triggered.

In a further embodiment the method for detection of a separation frequency for a radar level gauge in accordance with the present invention comprises the additional steps of: arranging a third circuit element 4, such as a third edge triggered flip-flop or D flip-flop, such that a predetermined value will be transferred to and held at an inverted output /Q thereof triggered by an inverted output signal /Q from said first circuit element 1, and; arranging said third circuit element 4 to clear said predetermined value from said inverted output /Q of said third circuit element 4 a predetermined time period after being triggered.

In a yet further embodiment the method for detection of a separation frequency for a radar level gauge in accordance with the present invention comprises the additional steps of: arranging a fourth circuit element 5, such as a fourth edge triggered flip-flop or D flip-flop, such that the value of an inverted output signal from said second circuit element 3 will be transferred to and held at an output Q thereof, and; arranging said fourth circuit element 5 to clear said value triggered by an inverted output /Q from said third circuit element 4.

In a still further embodiment the method for detection of a separation frequency for a radar level gauge in accordance with the present invention comprises the additional steps of: arranging a fifth circuit element 6, such as a fifth edge triggered flip-flop or D flip-flop, to receive a first clock frequency; arranging said fifth circuit element 6 such that an instantaneous value of the first clock frequency will be transferred to and held at an output Q thereof once each period of the output signal Q from the second circuit element 3.

In yet a still further embodiment the method for detection of a separation frequency for a radar level gauge in accordance with the present invention comprises the additional steps of: arranging a sixth circuit element 7, such as a sixth edge triggered flip-flop or D flip-flop, to receive a first clock frequency; arranging said sixth circuit element 7 such that an instantaneous value of the first clock frequency will be transferred to and held at an output Q thereof once each period of the output signal Q from the fourth circuit element 5.

Figure 11:
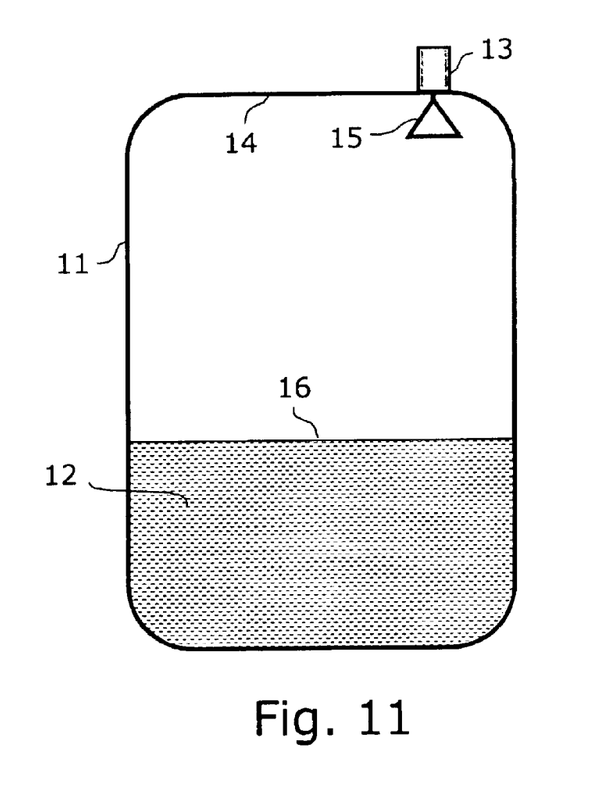
FIG. 11 illustrates an example application of a radar level gauge using microwaves for measuring a level of a surface of a product stored in a container.

The present invention further relates to a radar level gauge using microwaves for measuring a level of a surface 16 of a product 12 in a container 11, an application of which radar level gauge is shown in FIG. 11. A container such as a tank 11 is used for storing the product 12. The product may be such as oil, refined products, chemicals and liquid gas, or may be a material in powder form. A radar 13 is attached to the roof 14 of the tank 11. A microwave beam is transmitted from the radar via an antenna 15 at the interior of the tank. The transmitted beam is reflected from the surface 16 of the product and is received by the antenna 15. By means of a comparison and evaluating of the time lap between transmitted and reflected beam in a measuring and controlling unit, a determination of the level of the product surface 16 is performed in a known manner. The microwave may be transmitted from the antenna as a free radiated beam or via a wave guide (not shown), which communicates with the product. The radar level gauge as shown in FIG. 11 comprises an antenna 15 for transmitting microwaves towards the surface and receiving microwaves reflected by the surface 16. A microwave transfer medium, such as a waveguide or a coaxial cable, coupled at a first end to a measurement circuitry. The measurement circuitry is arranged to transmit and receive microwaves via the antenna 15. The measurement circuitry further being arranged to determine the level of the product 12 in the tank 11 based on the relation between transmitted and received microwaves. The measurement circuitry being arranged to determine the level of the product 12 in the tank 11 based on an analysis of a relation between microwaves transmitted at a second clock frequency, e.g. a pulse repetition frequency (TX CLOCK), and received microwaves sampled at a first clock frequency, e.g. a sample frequency (RX CLOCK). For the purpose of said determination the measurement circuitry includes a separation frequency detector, as described in detail above, for precisely determining the separation frequency between said first and second clock frequencies of said radar level gauge, e.g. a difference (DELTA F) between said pulse repetition frequency (TX CLOCK) and said sample frequency (RX CLOCK).

In an additional embodiment the above described radar level gauge further comprises power supply circuitry for providing and distributing electrical power within the radar level gauge, and communication circuitry for communicating information including an indication of the level of the surface 16, and a two-wire interface for reception of electrical power to said power supply circuitry and for communication handled by said communication circuitry.

In yet a further embodiment the above described radar level gauge the power supply circuitry further includes energy storage circuitry.

The invention is not limited to the above-described embodiments, but may be varied within the scope of the following claims.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those circuit elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A separation frequency detector circuit for a radar level gauge comprising:

a first circuit element which is arranged to receive a first clock frequency and a second clock frequency, said first circuit element being arranged such that an instantaneous value of said first clock frequency will be transferred to and held at an output of said first circuit element once each period of said second clock frequency;

wherein a second circuit element is arranged such that a predetermined value will be transferred to and held at an output of said second circuit element triggered by said output of said first circuit element, and said second circuit element further being arranged to clear said predetermined value from said output of said second circuit element a predetermined time period after being triggered, whereby said output of said second circuit element is arranged to provide an output signal comprising information relating to the separation frequency between said first and second clock frequencies of said radar level gauge.

2. The circuit claim 1, wherein a third circuit element is arranged such that a predetermined value will be transferred to and held at an inverted output of said third circuit element triggered by an inverted output of said first circuit element, and said third circuit element further being arranged to clear said predetermined value from said inverted output of said third circuit element a predetermined time period after being triggered, whereby said inverted output of said third circuit element is arranged to provide an output signal comprising information relating to the separation frequency between said first and second clock frequencies of said radar level gauge.

3. The circuit of claim 2, wherein a fourth circuit element is arranged such that a value of an inverted output of said second circuit element will be transferred to and held at an output of said fourth circuit element, and said fourth circuit element further being arranged to clear said value triggered by an inverted output from said third circuit element, whereby said output of said fourth circuit element is arranged to provide an output signal essentially corresponding to the separation frequency between said first and second clock frequencies of said radar level gauge.

4. The circuit of claim 3, wherein a sixth circuit element is arranged to receive said first clock frequency, said sixth circuit element being arranged such that an instantaneous value of said first clock frequency will be transferred to and held at an output of said sixth circuit element once each period of said output of said fourth circuit element, whereby said output of said sixth circuit element is arranged to provide an output signal comprising information relating to the phase of said separation frequency between said first and second clock frequencies of said radar level gauge.

5. The circuit claim 1, wherein a fifth circuit element is arranged to receive said first clock frequency, said fifth circuit element being arranged such that an instantaneous value of said first clock frequency will be transferred to and held at an output of said fifth circuit element once each period of said output of said second circuit element, whereby said output of said fifth circuit element is arranged to provide an output signal comprising information relating to the phase of said separation frequency between said first and second clock frequencies of said radar level gauge.

6. A method for detection of a separation frequency in a radar level gauge said method comprising:

arranging a first circuit element to receive a first clock frequency and a second clock frequency, arranging said first circuit element such that an instantaneous value of said first clock frequency will be transferred to and held at an output of said first circuit element once each period of said second clock frequency;

arranging a second circuit element such that a predetermined value will be transferred to and held at an output of said second circuit element triggered by said output of said first circuit element, and arranging said second circuit element to clear said predetermined value from said output of said second circuit element a predetermined time period after being triggered, and detecting at said output of said second circuit element an output signal comprising information relating to the separation frequency between said first and second clock frequencies of said radar level gauge.

7. The method of claim 6 further comprising:

arranging a third circuit element such that a predetermined value will be transferred to and held at an inverted output of said third circuit element triggered by an inverted output of said first circuit element, and arranging said third circuit element to clear said predetermined value from said inverted output of said third circuit element a predetermined time period after being triggered, and detecting at said inverted output of said third circuit element-an output signal comprising information relating to the separation frequency between said first and second clock frequencies of said radar level gauge.

8. The method of claim 7 further comprising:

arranging a fourth circuit element such that a value of an inverted output from said second circuit element will be transferred to and held at an output of said fourth circuit element, and arranging said fourth circuit element to clear said value triggered by an inverted output from said third circuit element, and detecting at said output of said fourth circuit element an output signal essentially corresponding to the separation frequency between said first and second clock frequencies of said radar level gauge.

9. The method of claim 6, further comprising:

arranging a fifth circuit element to receive said first clock frequency, arranging said fifth circuit element such that an instantaneous value of said first clock frequency will be transferred to and held at an output of said fifth circuit element once each period of said output of said second circuit element, and detecting at said output of said fifth circuit element an output signal comprising information relating to the phase of said separation frequency between said first and second clock frequencies of said radar level gauge.

10. The method of claim 8 further comprising:

arranging a sixth circuit element to receive said first clock frequency, arranging said sixth circuit element such that an instantaneous value of said first clock frequency will be transferred to and held at an output of said sixth circuit element once each period of said output of said fourth circuit element, and detecting at said output of said sixth circuit element an output signal comprising information relating to the phase of said separation frequency between said first and second clock frequencies of said radar level gauge.

11. A radar level gauge arranged to use microwaves for determining a level of a surface of a product stored in a container, said radar level gauge comprising:

an antenna suitable for transmitting microwaves towards said surface and receiving microwaves reflected by said surface, and a microwave transfer medium, a first end of which being coupled to said antenna, and measurement circuitry, coupled to a second end of said microwave transfer medium, and said measurement circuitry is arranged to determine said level based on a relation between transmitted and received microwaves, and said measurement circuitry further being arranged to determine said level based on an analysis of a relation between microwaves transmitted at a second clock frequency and received microwaves sampled at a first clock frequency, and said measurement circuitry including for the purpose of said analysis a separation frequency detector for precisely determining the separation frequency between said first and second clock frequencies of said radar level gauge, wherein said separation frequency detector comprises:

a first circuit element which is arranged to receive a first clock frequency and a second clock frequency, said first circuit element being arranged such that an instantaneous value of said first clock frequency will be transferred to and held at an output of said first circuit element once each period of said second clock frequency, and a second circuit element is arranged such that a predetermined value will be transferred to and held at an output of said second circuit element triggered by said output of said first circuit element, and said second circuit element further being arranged to clear said predetermined value from said output of said second circuit element a predetermined time period after being triggered, and a third circuit element is arranged such that a predetermined value will be transferred to and held at an inverted output of said third circuit element triggered by an inverted output of said first circuit element, and said third circuit element further being arranged to clear said predetermined value from said inverted output of said third circuit element a predetermined time period after being triggered; and a fourth circuit element is arranged such that a value of an inverted output of said second circuit element will be transferred to and held at an output of said fourth circuit element, and said fourth circuit element further being arranged to clear said value triggered by an inverted output from said third circuit element, whereby said output of said fourth circuit element is arranged to provide an output signal essentially corresponding to the separation frequency between said first and second clock frequencies of said radar level gauge.

12. The radar level gauge of claim 11, wherein a fifth circuit element is arranged to receive said first clock frequency, said fifth circuit element being arranged such that an instantaneous value of said first clock frequency will be transferred to and held at an output of said fifth circuit element once each period of said output of said second circuit element, whereby said output of said fifth circuit element is arranged to provide an output signal comprising information relating to the phase of said separation frequency between said first and second clock frequencies of said radar level gauge.

13. The radar level gauge of claim 11, wherein a sixth circuit element is arranged to receive said first clock frequency, said sixth circuit element being arranged such that an instantaneous value of said first clock frequency will be transferred to and held at an output of said sixth circuit element once each period of said output of said fourth circuit element, whereby said output of said sixth circuit element is arranged to provide an output signal comprising information relating to the phase of said separation frequency between said first and second clock frequencies of said radar level gauge.

14. The radar level gauge of claim 11 further comprising:

power supply circuitry for providing and distributing electrical power in said radar level gauge; and communication circuitry for communicating information including an indication of said level of said surface, and a two-wire interface for reception of electrical power to said power supply circuitry and for communication handled by said communication circuitry.

15. The radar level gauge of claim 11, wherein said power supply circuitry further comprises energy storage circuitry.

* * * * *